(12) United States Patent  
Lan et al.

(10) Patent No.: US 7,701,097 B2
(45) Date of Patent: Apr. 20, 2010

(54) FAN, MOTOR AND IMPELLER THEREOF

(75) Inventors: Chung-Kai Lan, Taoyuan Hsien (TW); Hung-Chi Chen, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 233 days.

(21) Appl. No.: 11/657,572

(22) Filed: Jan. 25, 2007

(65) Prior Publication Data
US 2007/0205676 A1 Sep. 6, 2007

(30) Foreign Application Priority Data
Mar. 3, 2006 (TW) .............................. 95107178 A

(51) Int. Cl.
*H02K 9/00* (2006.01)
(52) U.S. Cl. ...................... 310/61; 310/60 A
(58) Field of Classification Search .................. 310/52, 310/58, 59, 60 R, 61–63, 60 A See application file for complete search history.

(56) References Cited

U.S. PATENT DOCUMENTS

| 6,384,494 | B1 * | 5/2002 | Avidano et al. ................ 310/58 |
| 6,773,239 | B2 * | 8/2004 | Huang et al. ................. 417/354 |
| 6,815,849 | B2 * | 11/2004 | Serizawa et al. .............. 310/62 |
| 7,061,155 | B1 * | 6/2006 | Lee .......................... 310/261.1 |

* cited by examiner

*Primary Examiner*—Dan D Le
(74) *Attorney, Agent, or Firm*—Birch, Stewart, Kolasch & Birch, LLP

(57) ABSTRACT

An impeller, which is driven by a stator, includes a conducting shell, a hub and a plurality of blades. The conducting shell covers at least one side of the stator. The hub covers the conducting shell. At least one air gap is formed between the hub and the stator. A top portion of the hub has an opening to partially expose a top portion of the conducting shell. At least one airflow passage is formed between an inner wall of the hub and an outer surface of the conducting shell. The airflow passage has at least one inlet connected with the opening and at least one outlet connected with the air gap. The blades are disposed around the circumferences of the hub.

19 Claims, 6 Drawing Sheets

FAN, MOTOR AND IMPELLER THEREOF

CROSS REFERENCE TO RELATED APPLICATIONS

This Non-provisional application claims priority under 35 U.S.C. §119(a) on Patent Application No(s). 095107178 filed in Taiwan, Republic of China on Mar. 3, 2006, the entire contents of which are hereby incorporated by reference.

BACKGROUND OF THE INVENTION

1. Field of Invention

The invention relates to a fan, a motor and an impeller, and, in particular, to a fan, a motor and an impeller with good heat dissipation ability.

2. Related Art

With the rapid development of electronic products toward increasing performance, frequency, and speed, as well as increasing demand for compact, slim-profile, lightweight devices, the operating temperature of electronic products is correspondingly increasing. Due to this trend, there is also an increase in unstable heat-aggravated phenomena that influence product reliability. Therefore, current electronic products are often equipped with a fan that serves as a heat-dissipation device.

Referring to FIG. 1, a conventional fan 1 includes an impeller 11, a motor 12 and a frame 13. The impeller 11 includes a hub 111 and a plurality of blades 112 disposed around the hub 111. The motor 12 is accommodated in the hub 111, and is connected with the impeller 11 to drive the rotation of impeller 11. The impeller 11 and the motor 12 are disposed in the frame 13. The fan 1 encapsulates a top portion 1111 of the hub 111 to prevent foreign objects from entering the hub 111 in order to protect the motor 12. However, this causes the heat dissipated by the motor 12 to be restricted to the hub 111 and thus the heat-dissipating effect is poor. Thus, the efficiency of the fan 1 may deteriorate due to the greatly increased environmental temperature after a long period of operation.

Referring to FIG. 2, another conventional fan 2 includes an impeller 21, a motor 22 and a frame 23. The impeller 21 includes a hub 211 and a plurality of blades 212 disposed around the hub 211. The motor 22 is accommodated in the hub 211 and is connected with the impeller 21 to drive the rotation of impeller 21. The impeller 21 and the motor 22 are disposed in the frame 23. A top portion 2111 of the hub 211 has an opening 2112 to expose a conducting shell 221 of the motor 22. The exposed portion of the conducting shell 221 has a plurality of holes 2211, through which the airflow "a" enters the motor 22 to dissipate the heat produced by the motor 22. However, foreign objects or dust may also fall down into the motor 22 and damage the motor as the airflow "a" flows through the holes 2211.

Thus, it is an important subject of the invention to provide a fan, a motor and an impeller capable of solving the problems of dissipating motor-generated heat and preventing foreign objects from entering the motor, thus enhancing the fan efficiency.

SUMMARY OF THE INVENTION

In view of the foregoing, the invention is to provide a fan, a motor and an impeller capable of solving the problems of dissipating motor-generated heat, preventing foreign objects from entering the motor, and thus enhancing the fan efficiency.

To achieve the above, the invention discloses an impeller driven by a stator. The impeller includes a conducting shell, a hub and a plurality of blades. The conducting shell covers at least one side of the stator. The hub covers the conducting shell. At least one air gap is formed between the hub and the stator. A top portion of the hub has an opening to partially expose a top portion of the conducting shell. At least one airflow passage having at least one inlet and at least one outlet is formed between an inner wall of the hub and an outer surface of the conducting shell. The inlet is connected with the opening. The outlet is connected with the air gap. The blades are disposed around the hub.

To achieve the above, the invention also discloses a motor including a rotor and a stator. The rotor includes a conducting shell and a hub. The conducting shell covers at least one side of the stator. The hub covers the conducting shell. At least one air gap is formed between the hub and the stator. A top portion of the hub has an opening to partially expose a top portion of the conducting shell. At least one airflow passage is formed between an inner wall of the hub and an outer surface of the conducting shell. The airflow passage has at least one inlet and at least one outlet. The inlet is connected with the opening. The outlet is connected with the air gap.

To achieve the above, the invention also discloses a fan including a rotor and a stator. The rotor includes a conducting shell, a hub and a plurality of blades. The conducting shell covers at least one side of the stator. The hub covers the conducting shell. At least one air gap is formed between the hub and the stator. A top portion of the hub has an opening to partially expose a top portion of the conducting shell. At least one airflow passage is formed between an inner wall of the hub and an outer surface of the conducting shell. The airflow passage has at least one inlet and at least one outlet. The inlet is connected with the opening. The outlet is connected with the air gap. The blades are disposed around the hub.

As mentioned above, the airflow passage is formed between the inner wall of the hub and the conducting shell in the fan, the motor and the impeller thereof according to the invention. The heat generated by the operating stator can be transferred, via the conducting shell, to the airflow flowing through the airflow passage. The heat is then drawn out of the fan, the motor and the impeller via the air gap by the airflow so that the dissipation effect on self-produced heat as well as the operation efficiencies of the fan, the motor and the impeller can be enhanced. In addition, because it is unnecessary to form a hole on the top portion of the conducting shell according to the heat dissipation method, it is advantageous to prevent the foreign objects from entering the fan and the motor from the top portion of the conducting shell, and thus to prevent the internal elements of the fan and the motor from being damaged by intruding foreign objects.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
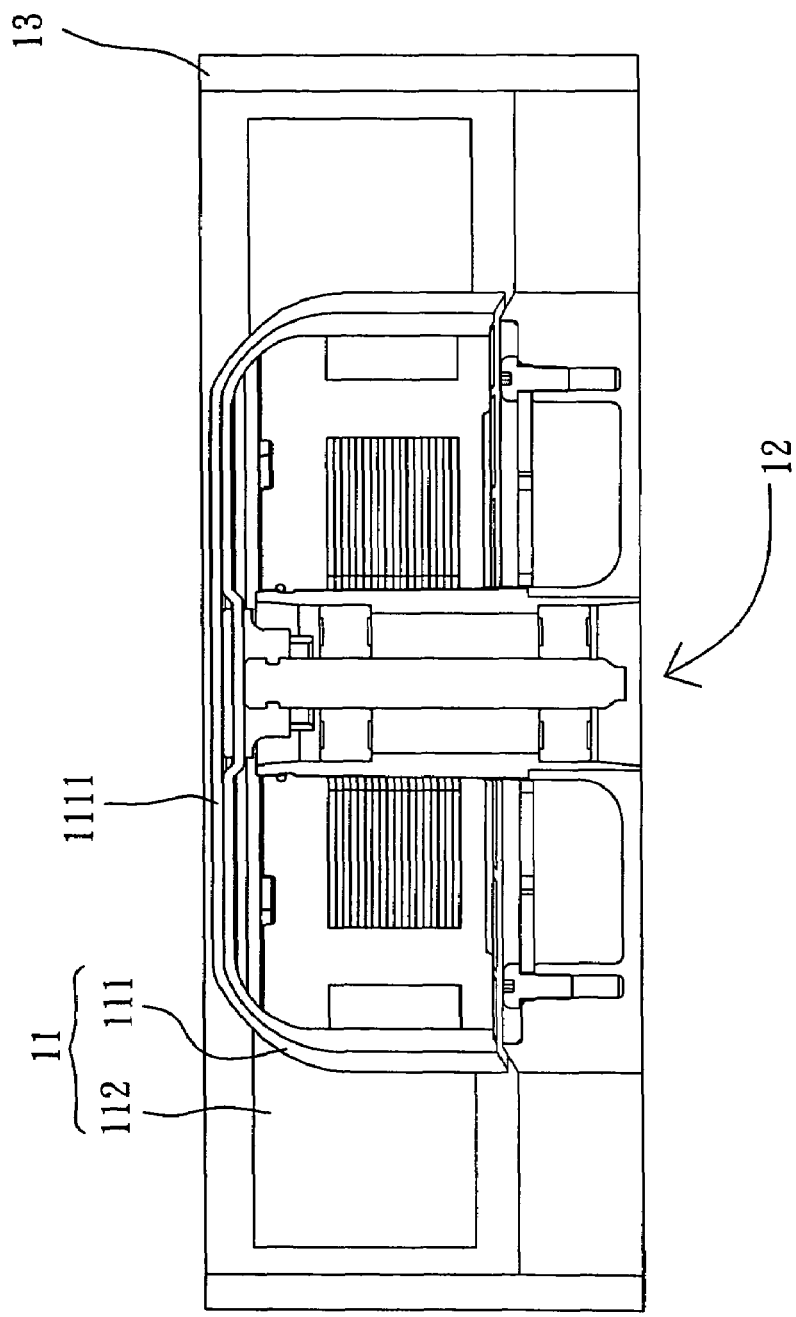
FIG. 1 is a cross-sectional view of a conventional fan.
Figure 2:
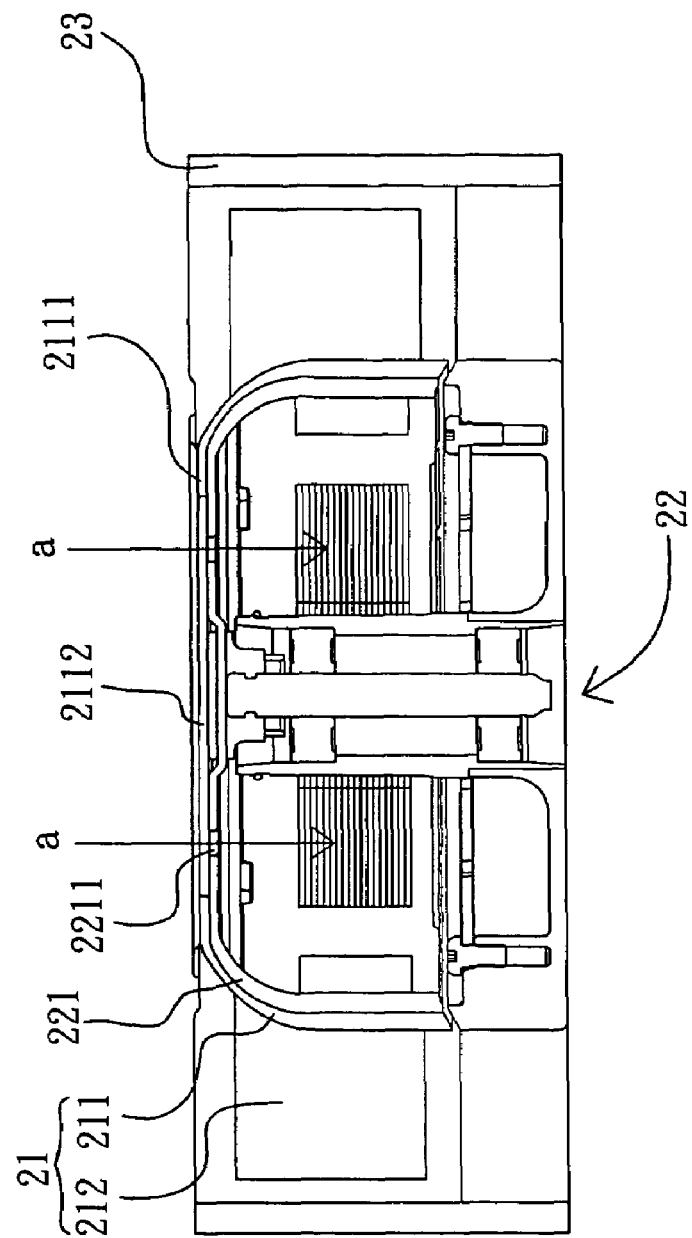
FIG. 2 is a cross-sectional view of another conventional fan.
Figure 3:
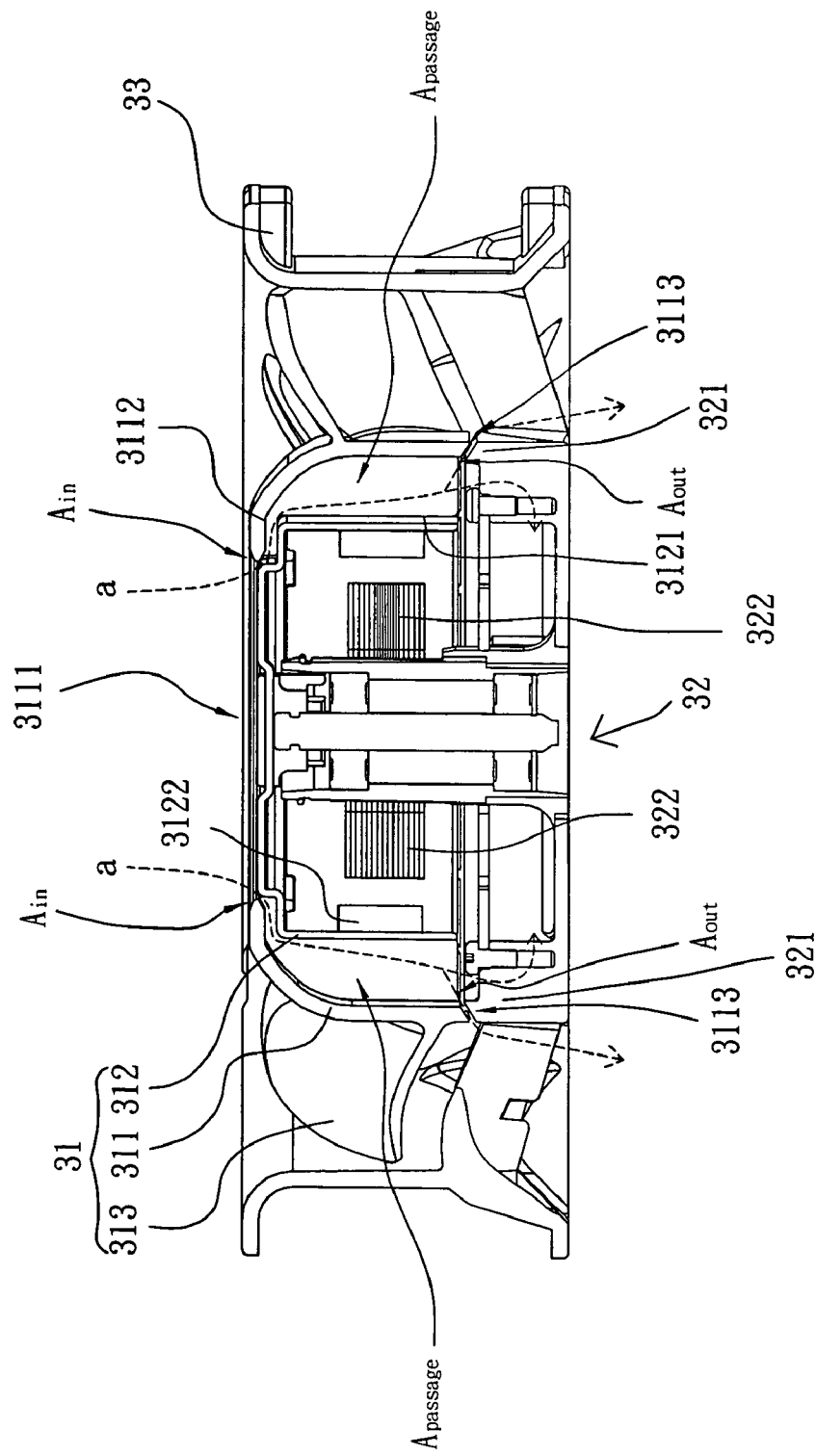
FIG. 3 is a cross-sectional view showing a fan according to a first embodiment of the invention.

Referring to FIG. 3, a fan 3 according to a first embodiment of the invention includes a rotor 31, a stator 32 and a frame 33. The rotor 31 and the stator 32 are disposed in the frame 33, and the rotor 31 is driven by the stator 32. In this embodiment, the rotor 31 includes a hub 311, a conducting shell 312 and a plurality of blades 313. The conducting shell 312 covers at least one side of the stator 32. The hub 311 is coupled to the conducting shell 312. The blades 313 are disposed around the hub 311.

In this embodiment, the blades 313 and the hub 311 can be integrally formed as a single piece or individually formed and then assembled together. The blades 313 may be centrifugal blades, axial flowing blades, flat blades or curved blades. The hub 311 can be cylindrical, polygonal or U-shaped. The conducting shell 312 can be made of metallic material, alloy, thermo-conductive material or magnetic material. The conducting shell 312 and the hub 311 can be connected with each other by way of engaging, embedding, screwing, bonding, hot welding, ultrasonic welding or adhering. In addition, the conducting shell 312 has a rotor pole 3122, and the stator 32 has a stator pole 322 corresponding to the rotor pole 3122.

The hub 311 has at least one opening 3111 and at least one airflow passage $A_{passage}$. The opening 3111 is formed on a surface, e.g., a top portion, of the hub 311 to partially expose a top portion of the conducting shell 312. The opening 3111 can be polygonal, circular or elliptical. The airflow passage $A_{passage}$, which is formed between the hub 311 and the conducting shell 312 and preferably between an inner wall 3112 of the hub 311 and an outer surface 3121 of the conducting shell 312, has at least one inlet $A_{in}$ and at least one outlet $A_{out}$. The inlet $A_{in}$ is connected to the opening 3111. In this embodiment, the inner diameter of the inlet $A_{in}$ is smaller than 2.5 mm.

In addition, at least one air gap 3113 is formed between the hub 311 and the stator 32 so that the hub 311 does not contact the stator 32. The outlet $A_{out}$ is connected to the air gap 3113. In this embodiment, the stator 32 further includes a base 321. The air gap 3113 is located between an edge of the base 321 and an edge of the hub 311 and is ring-shaped.

When the stator 32 drives the rotor 31 to rotate, the flow velocity of the airflow around the outlet $A_{out}$ is higher than that around the inlet $A_{in}$. That is, the static pressure of the airflow at the inlet $A_{in}$ is greater than that at the outlet $A_{out}$ so that an airflow "a" can enter the airflow passage $A_{passage}$ through the inlet $A_{in}$ and bring the heat outputted by the motor out of the outlet $A_{out}$ in a convective manner. Thus, the self-generated heat dissipation efficiency of the motor may be improved.

Figure 4:
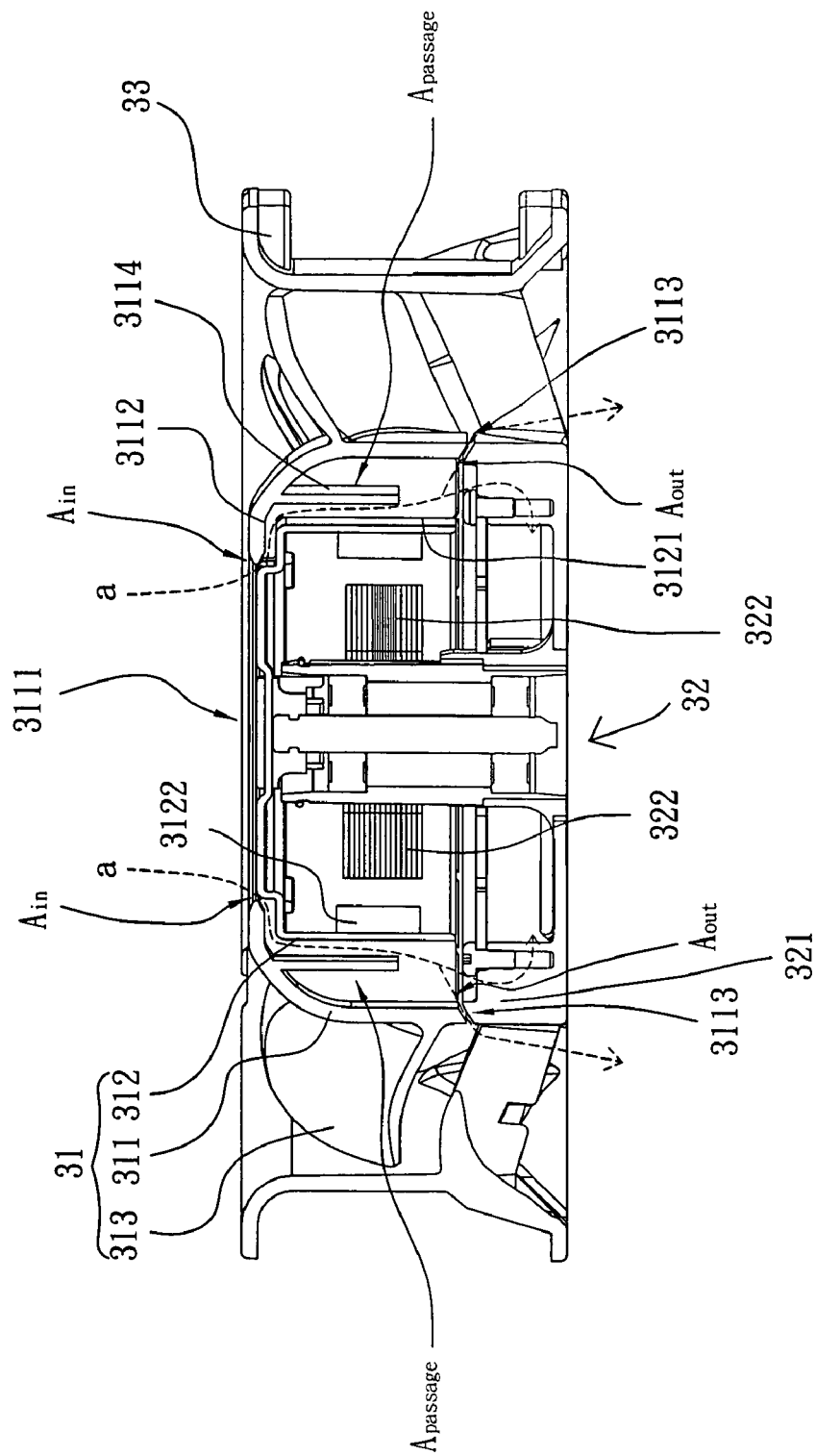
FIG. 4 is a cross-sectional view showing a fan according to a second embodiment of the invention.

In addition, the following design can be made in order to stabilize the airflow "a" flowing through the airflow passage $A_{passage}$ and constrain the airflow "a" against the conducting shell 312, thus enhancing the self-generated heat dissipation efficiency of the motor. FIG. 4 is a cross-sectional view showing a fan according to a second embodiment of the invention. A fan 3A of this embodiment has the same structures and functions as those of the first embodiment except that the fan 3A further includes at least one airflow guiding structure 3114 formed between the hub 311 and the conducting shell 312 to serve as at least one sidewall, which is disposed on the inner wall 3112 of the hub 311, for the airflow passage $A_{passage}$. The airflow guiding structure 3114 can also be disposed on the outer surface 3121 of the conducting shell 312 to close the airflow "a" against the outer surface 3121 of the conducting shell 312 so that the convective effect and the self-generated heat dissipation efficiency of the motor can be enhanced. The airflow guiding structure 3114 may be a strip-like, flat, semi-cylindrical, curved or polygonal structure, and can be integrally formed with the hub 311 or the conducting shell 312 as a single piece or assembled on the hub 311 or the conducting shell 312.

In this embodiment, the sidewall of the conducting shell 312 has at least one radial hole communicated with the airflow passage $A_{passage}$. Thus, the heat in the motor can flow to the airflow passage $A_{passage}$ outside the conducting shell 312 through the at least one radial hole, thereby enhancing the heat dissipation efficiency.

Figure 5:
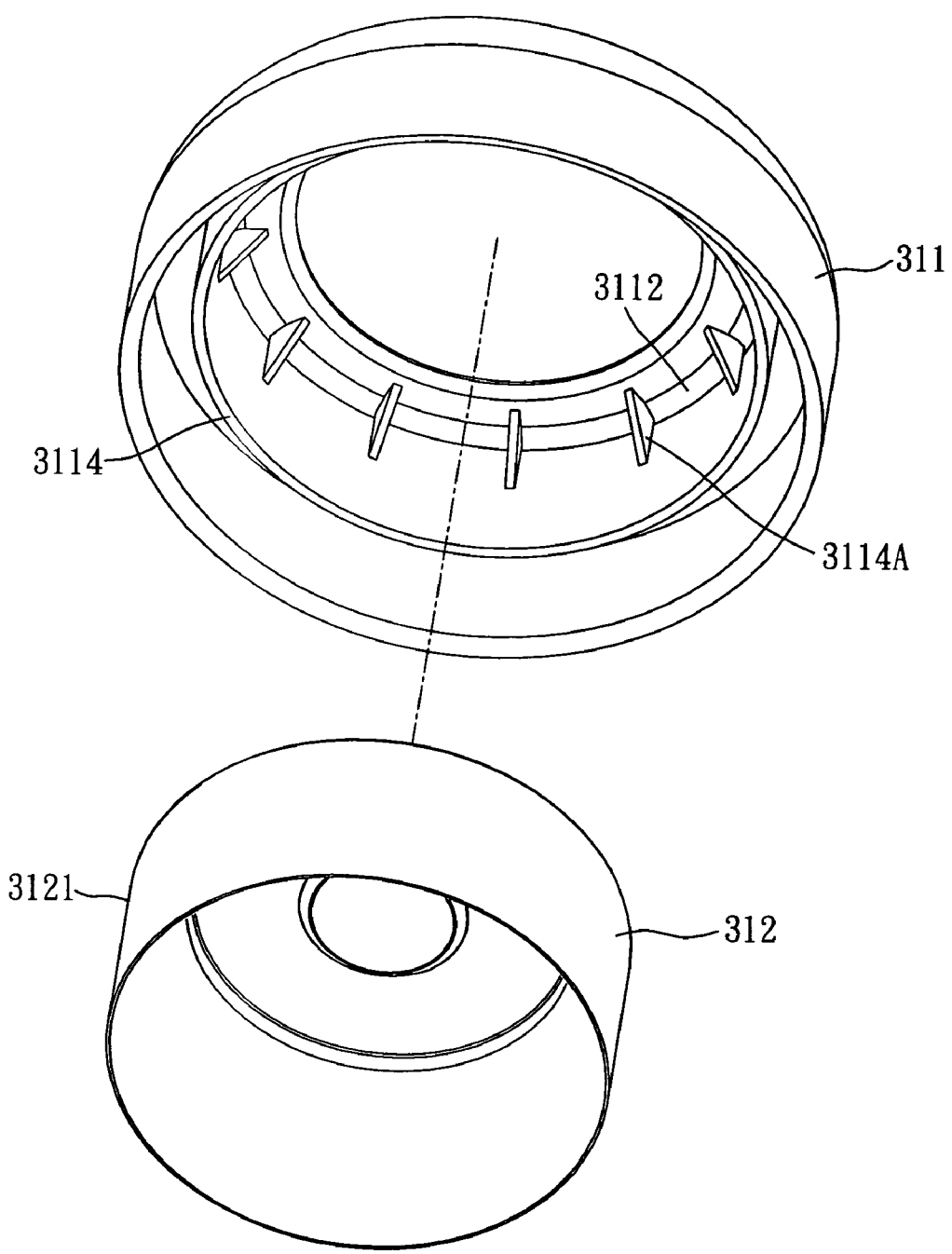
FIG. 5 is a schematic illustration showing a hub with an airflow guiding structure according to the invention.

In addition, as shown in FIG. 5, another airflow guiding structure 3114A can be disposed between the top of the hub 311 and the conducting shell 312. The airflow guiding structure 3114A is used to provide additional suction and guiding effects on the airflow "a". Thus, the airflow "a" is sucked through the inlet $A_{in}$, and is guided into the airflow passage $A_{passage}$ faster. When the airflow "a" enters the airflow passage $A_{passage}$, the airflow guiding structure 3114 can further guide it to obtain enhanced performance. To be noted, the airflow guiding structure 3114A can be disposed on either the inner wall 3112 of the hub 311 or the outer surface 3121 of the conducting shell 312.

Figure 6:
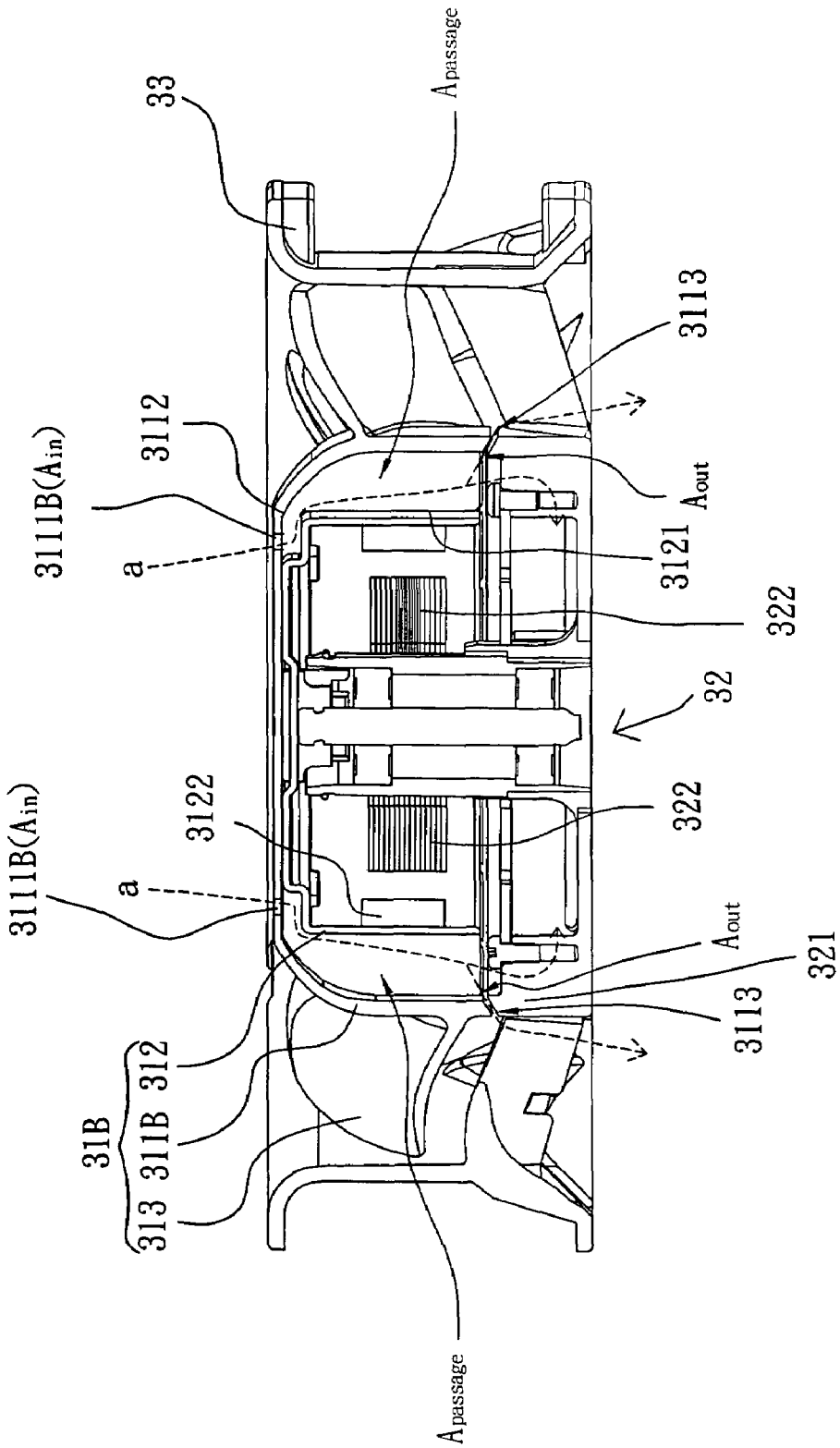
FIG. 6 is a cross-sectional view showing a fan according to a third embodiment of the invention.

FIG. 6 is a cross-sectional view showing a fan according to a third embodiment of the invention. Referring to FIG. 6, a fan 3B includes a rotor 31B, a stator 32 and a frame 33. The stator 32 and the frame 33 of this embodiment have the same structures and functions as those of the first embodiment, and detailed descriptions thereof will be omitted. The difference between this embodiment and the first embodiment is that the inlet $A_{in}$ is not formed by an opening of the hub and the outer surface of the conducting shell. A top portion of a hub 311B of the rotor 31B has at least one opening 3111B to serve as the inlet $A_{in}$, through which an airflow "a" can enter the airflow passage $A_{passage}$ to bring the heat produced by the motor out of the outlet $A_{out}$ in a convective manner. In this embodiment, the inner diameter of the opening 3111B is smaller than 2.5 mm.

In addition, the airflow guiding structure 3114 of the second embodiment may be similarly applied to the fan 3B of the third embodiment to further enhance the self heat dissipating efficiency of the motor.

In summary, the airflow passage is formed between the inner wall of the hub and the conducting shell in the fan, the motor and the impeller thereof according to the invention. The heat generated as the stator is operating may be transferred, via the conducting shell, to the airflow flowing through the airflow passage. The heat is then drawn out of the fan, the motor and the impeller via the air gap by the airflow so that the dissipation effect on self-produced heat as well as the operation efficiencies of the fan, the motor and the impeller can be enhanced, respectively. In addition, because it is unnecessary to form a hole on the top portion of the conducting shell according to the heat dissipation method, it is possible to prevent the foreign objects from entering the fan and the motor from the top portion of the conducting shell, and thus to prevent the internal elements of the fan and the motor from being damaged by intruding foreign objects.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A fan, comprising:
   a stator;
   a rotor comprising a conducting shell, a hub, and a plurality of blades disposed around the hub, wherein the conducting shell covers at least one side of the stator, and the hub is coupled to the conducting shell and has at least one opening formed on a surface of the hub to partially expose the conducting shell, and at least one airflow passage formed between the hub and an outer surface of the conducting shell and communicated to the opening; and
   an airflow guiding structure disposed between a top of the hub and the conducting shell or disposed on either the inner wall of the hub or the outer surface of the conducting shell to provide additional suction so as to guide an airflow into the airflow passage faster, wherein the top portion of the conducting shell is substantially sealed so as to prevent foreign objects from entering the motor.

2. The fan according to claim 1, wherein there is at least one air gap formed between the hub and the stator.

3. The fan according to claim 2, wherein the stator comprises a base, and the air gap is disposed between an edge of the base and an edge of the hub.

4. The fan according to claim 1, wherein the at least one airflow passage has at least one inlet connected to the opening, and at least one outlet connected to the air gap.

5. The fan according to claim 4, wherein an inner diameter of the inlet is smaller than 2.5 mm.

6. The fan according to claim 1, wherein the conducting shell is made of metallic material, alloy, thermo-conductive material or magnetic material.

7. The fan according to claim 1, wherein the conducting shell is connected to the hub by way of engaging, embedding, screwing, bonding, hot welding, ultrasonic welding or adhering.

8. The fan according to claim 1, wherein the airflow guiding structure serves as at least one sidewall of the at least one airflow passage.

9. The fan according to claim 8, wherein the airflow guiding structure is a strip-like, flat, semi-cylindrical, curved or polygonal structure.

10. The fan according to claim 1, wherein the airflow guiding structure is integrally formed with the hub or the conducting shell as a single piece.

11. The fan according to claim 1, wherein the opening has a polygonal, circular or elliptical shape; the blades are centrifugal, axial flowing, flat or curved blades; and the hub is cylindrical, polygonal or U-shaped.

12. The fan according to claim 1, wherein a sidewall of the conducting shell has at least one radial hole communicated with the airflow passage.

13. A motor, comprising:
    a stator; and
    a rotor comprising a conducting shell and a hub, wherein the conducting shell covers the stator structure, and the hub is coupled to the conducting shell and has at least one opening formed on a surface of the hub to partially expose the conducting shell, and at least one airflow passage formed between the hub and an outer surface of the conducting shell and connected to the opening, wherein the top portion of the conducting shell is substantially sealed so as to prevent foreign objects from entering the motor.

14. The motor according to claim 13, wherein there is at least one air gap formed between the hub and the stator, the at least one airflow passage has at least one inlet connected to the opening, and at least one outlet connected to the air gap.

15. The motor according to claim 14, wherein the stator comprises a base, and the air gap is disposed between an edge of the base and an edge of the hub.

16. The motor according to claim 13, further comprising at least one airflow guiding structure disposed on the hub or the conducting shell to serve as at least one sidewall of the at least one airflow passage.

17. The motor according to claim 16, wherein the airflow guiding structure is integrally formed with the hub or the conducting shell as a single piece.

18. The motor according to claim 13, wherein a sidewall of the conducting shell has at least one radial hole communicated with the airflow passage.

19. An impeller driven by a stator structure, comprising:
    a conducting shell covering the stator structure;
    a hub coupled to the conducting shell and having at least one opening and at least one airflow passage, wherein the opening is formed on a surface of the hub to partially expose the conducting shell, and the airflow passage is formed between the hub and an outer surface of the conducting shell and connected with the opening of the hub, wherein an airflow passes through the opening of the hub to the airflow passage so as to dissipate motor-generated heat; and
    a plurality of blades mounted around the hub, wherein the top portion of the conducting shell is substantially sealed so as to prevent foreign objects from entering the motor.

* * * * *